United States Patent
Ye et al.

(10) Patent No.: US 12,079,365 B2
(45) Date of Patent: Sep. 3, 2024

(54) SYSTEMS AND METHODS FOR USING MACHINE LEARNING TO MANAGE DATA

(71) Applicant: Capital One Services, LLC, McLean, VA (US)

(72) Inventors: William Ye, McLean, VA (US); Jon Stofer, McLean, VA (US); Thomas J. O'Connor, McLean, VA (US); Jose Moreno, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 427 days.

(21) Appl. No.: 17/567,664

(22) Filed: Jan. 3, 2022

(65) Prior Publication Data

US 2023/0214515 A1    Jul. 6, 2023

(51) Int. Cl.
*G06F 21/62* (2013.01)
*G06F 18/214* (2023.01)
*G06F 18/22* (2023.01)
*G06N 20/00* (2019.01)

(52) U.S. Cl.
CPC ........ *G06F 21/6227* (2013.01); *G06F 18/214* (2023.01); *G06F 18/22* (2023.01); *G06N 20/00* (2019.01); *G06F 2221/2141* (2013.01)

(58) Field of Classification Search
CPC .... G06F 21/6227; G06F 18/214; G06F 18/22; G06F 2221/2141; G06F 21/604; G06F 21/6218; G06F 21/6245; G06N 20/00; G06N 3/084; G06N 3/092; G06N 7/01; G06N 3/09; G06Q 30/01; G06Q 30/0201; G06Q 30/0609; G06Q 40/03
See application file for complete search history.

(56) References Cited

U.S. PATENT DOCUMENTS

| | | | |
|---|---|---|---|
| 11,238,172 B2* | 2/2022 | Subramanian | H04L 67/535 |
| 11,625,555 B1* | 4/2023 | Zhiyanov | G06F 18/24 706/20 |
| 2021/0303585 A1* | 9/2021 | Fan | G06F 16/27 |
| 2022/0027339 A1* | 1/2022 | Haim | G06F 16/221 |
| 2022/0335340 A1* | 10/2022 | Moustafa | G06F 11/3003 |
| 2023/0325717 A1* | 10/2023 | Ulasen | G06N 20/00 706/12 |

* cited by examiner

*Primary Examiner* — Mohammed Waliullah
(74) *Attorney, Agent, or Firm* — Foley & Lardner LLP (57) ABSTRACT

In certain embodiments, machine learning and lineage data may be used to manage data. In some embodiments, a computing system may use lineage data to identify two datasets that may be related. The computing system may determine that a user has access to a derivative dataset but does not have access to an original dataset that was used to create the derivative dataset. In response, the computing system may use a machine learning model to generate a similarity score indicating a level of similarity between the original dataset and the derivative dataset. If the similarity score satisfies a threshold score, the computing system may modify access rights of the user so that the user is unable to access a portion of the data in the derivative dataset.

20 Claims, 7 Drawing Sheets

FIG. 1

| Transaction ID | Type | Amount | Point of Sale |
|---|---|---|---|
| 322 | Credit Card | $28 | Retail Store A |
| 323 | Check | $240 | Retail Store B |

200
205 — 210

| Type | Average Amount Per Transaction | Point of Sale |
|---|---|---|
| Credit Card | $87 | Retail Store A |
| Check | $127 | Retail Store B |

SYSTEMS AND METHODS FOR USING MACHINE LEARNING TO MANAGE DATA

BACKGROUND

In recent years, as the use of computer systems increases, the amount of data that is generated and stored has grown exponentially. Organizations store large quantities of data in the form of datasets that are used for various purposes. Some datasets that are generated or collected are then transformed through various functions to create derivative datasets.

SUMMARY

Conventional computing systems obtain data from a variety of sources and store the data in datasets. Various teams in an organization may use a dataset (e.g., an original dataset) to generate additional derivative datasets, often resulting in some overlap among the original dataset and the derivative datasets. Over time, as derivative datasets from such datasets are continually generated and stored on one or more databases, organizations typically see substantial cost increases, outdated data within the datasets, or other issues. For example, one team in an organization may be unaware of what another team is doing, and they may each generate similar derivative datasets from a single original dataset.

In conventional computing systems, it may be difficult to reduce storage costs via an automated process because similar datasets may not have exact schema matches and may have some overlapping data and some non-overlapping data. As such, the foregoing may render conventional rules-based approaches ineffective for managing data. Additionally, derivative datasets may create security or privacy issues for organizations in terms of data access. Conventional data access control systems can have difficulty determining whether a user should have access to a dataset when it is derived from another dataset. For example, a user may gain access to a derivative dataset even though the user is restricted from accessing the original data from which the derivative dataset was generated.

To address these or other issues, non-conventional techniques described herein use data lineage information and machine learning to merge datasets and thus reduce storage costs. Additionally, non-conventional techniques described herein allow a monitoring system to effectively control access to data to prevent or revoke inadvertently grants of access to original data in a protected dataset when the user is allowed to access a corresponding derivative dataset that includes the original data. As an example, the non-conventional technique of combining data lineage information with the use of machine learning allows a computing system to accurately determine whether or the extent to which two datasets are similar. The computing system may then determine whether access rights to the datasets should be modified, whether a portion of the two datasets should be merged to reduce storage costs, or whether other operations should be performed.

In some embodiments, computing system may use lineage data to identify two datasets that may be related (e.g., an original dataset and a derivative dataset, two derivative datasets that were derived from the same original dataset, etc.). The computing system may obtain access data indicating respective access rights related to the original dataset and the derivative dataset. For example, the computing system may determine that a user has access to a derivative dataset but does not have access to an original dataset that was used to create the derivative dataset. In response, the computing system may use a machine learning model to generate a similarity score indicating a level of similarity between the original dataset and the derivative dataset. For example, the computing system may generate a vector for each dataset using the machine learning model and may create a similarity score for the vectors using a distance metric. The computing system may compare the similarity score with a threshold. For example, if the similarity score exceeds the threshold, the computing system may modify access rights of the user so that the user is unable to access a portion of the data in the derivative dataset.

A computing system may additionally or alternatively determine whether two datasets are similar using other techniques. In some embodiments, the computing system may use a machine learning model trained to determine weighting to be applied to multiple similarity scores that correspond to different portions of datasets. For example, one similarity score may correspond to a comparison of the schema of the original dataset and the derivative dataset. Another similarity score may correspond to a comparison of the data of the original dataset and the derivative dataset. The computing system may use a machine learning model to generate weights for each similarity score and may use the weights to determine a weighted similarity score. In response to determining that the weighted score satisfies a similarity threshold, the computing system may merge a portion of the derivative dataset with the original dataset, modify access rights to one or more datasets, or perform other changes to such datasets.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
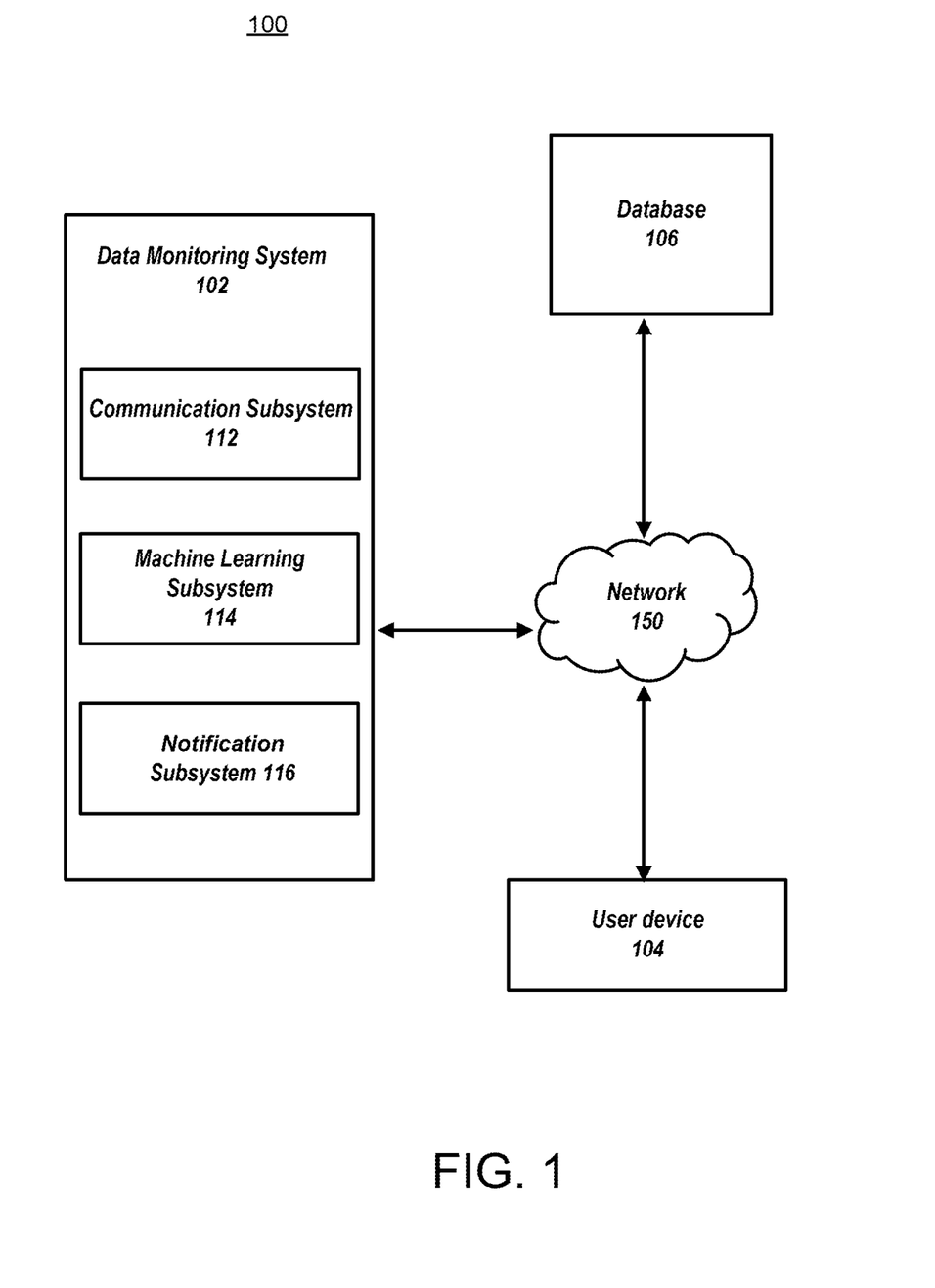
FIG. 1 shows an example system for using machine learning and lineage data to manage data, in accordance with some embodiments.

FIG. 1 shows an example computing system 100 for using machine learning and lineage data to manage datasets (e.g., by consolidating datasets and preventing inadvertent access to data). The system 100 may include a data monitoring system 102, a user device 104, or a database 106. The data monitoring system 102 may include a communication subsystem 112, a machine learning (ML) subsystem 114, a notification subsystem 116, or other components. The communication subsystem 112 may obtain datasets, lineage data, or other data from the database 106. The datasets may comprise any information that may be stored in an electronic database. For example, the datasets may include information related to users of software, transaction data, or a variety of other records. Some datasets may be derived from other datasets. A dataset may be processed by one or more functions to modify or transform the data and store the modified data in the derivative dataset. For example, an original dataset may be created through the collection of data from user devices such as the user device 104, by a first team in an organization. A second team may use data from the original dataset to create a derivative dataset, for example, by creating averages of values, combining values, or performing other function calls.

Figure 2A:
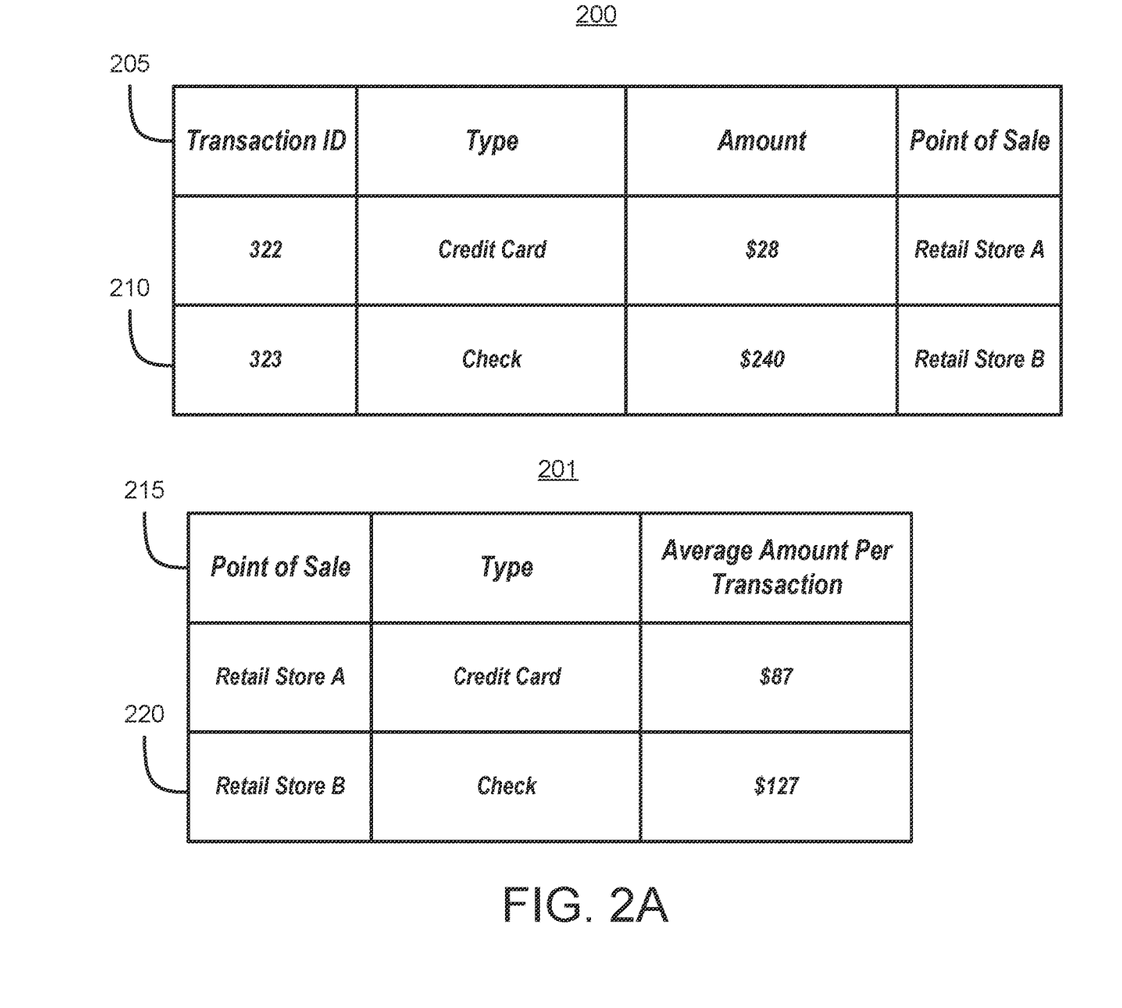
FIG. 2A shows an example dataset and corresponding derivative dataset, in accordance with some embodiments.

Referring to FIG. 2A, an example original dataset 200 and example derivative dataset 201 are shown. The original dataset may include a schema 205, which may include the names or descriptions of the columns in the original dataset. The original dataset 200 may include one or more rows of data 210. The derivative dataset 201 may include a schema 215 representing the columns in the derivative dataset 201 and one or more rows of data 220. The original dataset 200 may include transaction data from different points of sale (e.g., retail stores). The transaction data may include a transaction identification, a type (e.g., credit card, check, etc.), an amount of money, a location or point of sale, a customer ID (e.g., the person making the purchase at the retail store), or a variety of other information. The derivative dataset 201 may include a portion of the data from the original dataset or derivative data that was created using data from the original dataset 200. For example, the derivative dataset 201 includes an average amount (e.g., in dollars) per transaction at each point of sale. The average amount per transaction may have been calculated using the original dataset 200, for example, by averaging each amount for retail store A and by averaging each amount for retail store B.

Figure 2B:
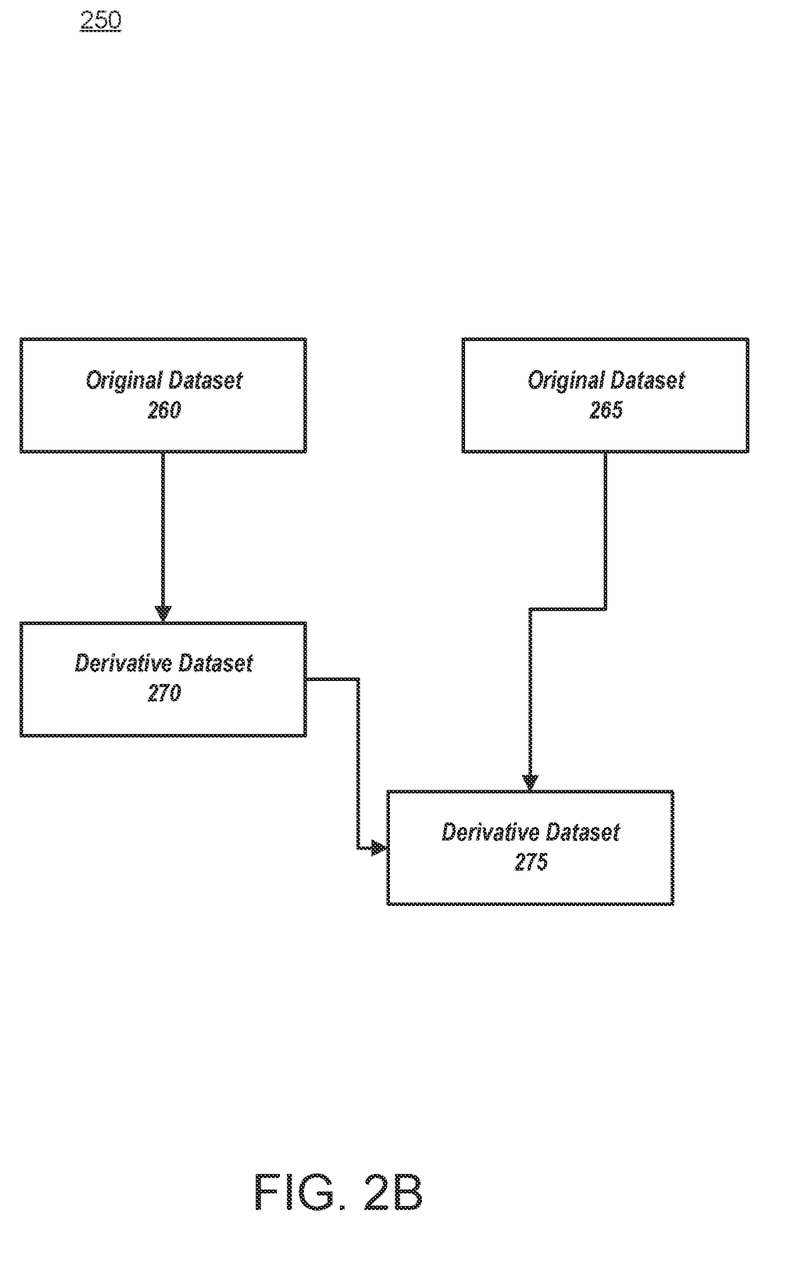
FIG. 2B shows example lineage data, in accordance with some embodiments.

Referring back to FIG. 1, the data monitoring system 102 may use lineage data to determine relationships between datasets. The lineage data may indicate a relationship between two or more datasets. The lineage data may indicate that a derivative dataset was derived from an original dataset. The lineage data may indicate the functions or processes used to create the derivative dataset (e.g., column A was created by subtracting column B from column C). The lineage data may include a data structure (e.g., a directed acyclic graph or other graph, a linked list, etc.). Referring to FIG. 2B, example lineage data 250 is shown. The lineage data 250 indicates original dataset 260 and original dataset 265. The lineage data 250 shows (e.g., via an arrow) that the derivative dataset 270 is derived from the original dataset 260. The lineage data 250 also shows that the derivative dataset 275 is derived from both the original dataset 265 and the derivative dataset 270. In some embodiments, lineage data may indicate a location (e.g., via a URI or other location information) where each dataset indicated in the lineage data may be found. The lineage data may also indicate who (e.g., a user identifier) created each dataset, one or more functions used to create each dataset, or other information.

The data monitoring system 102 may manage data by merging portions of datasets or deleting repetitive data across one or more datasets. The data monitoring system 102 may use lineage data to identify datasets that may be merged or otherwise modified. For example, the data monitoring system 102 may use the lineage data to identify a derivative dataset and an original dataset that is the source of the derivative dataset. The data monitoring system may begin by identifying a derivative dataset and then determine what datasets gave rise to the derivative dataset.

The data monitoring system 102 may use the original dataset and the derivative dataset to generate one or more similarity scores that may be used to determine whether a portion of the data should be merged or otherwise modified. A similarity score may also be used to determine whether a user should have access to the derivative dataset. For example, a user may have access to a derivative dataset but may be restricted from accessing an original dataset from which the derivative dataset was created. In some embodiments, the data monitoring system 102 may obtain access data indicating respective access rights related to the original dataset and the derivative dataset, in response to an original dataset being identified as the source for a derivative dataset. The data monitoring system 102 may determine, based on the access data, that a user has access to the derivative dataset and is restricted from accessing the original dataset. In response to determining that the user has access to the derivative dataset and is restricted from accessing the original dataset, the data monitoring system 102 may determine whether the original dataset and the derivative dataset are similar and whether access rights should be restricted as described in more detail below.

The data monitoring system 102 may restrict the user from accessing the derivative dataset, for example, if it is determined that the derivative dataset is similar to the original dataset (e.g., if the similarity score between the original dataset and the derivative dataset exceeds a threshold score). Additionally or alternatively, the data monitoring system 102 may restrict the user from accessing a portion of the derivative dataset, for example, if the portion is determined to be similar (e.g., within a threshold similarity) to the original dataset from which the user is restricted access. Additionally or alternatively, a similarity score may be used to determine whether two datasets should be merged or otherwise modified. For example, two datasets that are similar may be merged to reduce storage space required for one or more computer systems.

In some embodiments, the data monitoring system 102 may determine a user that both has access to the derivative dataset and is restricted from accessing the original dataset. In response to determining that the user has access to the derivative dataset and is restricted from accessing the original dataset, the data monitoring system 102 may generate a similarity score that indicates the similarity between the derivative dataset and the original dataset. The data monitoring system 102 (e.g., the machine learning subsystem 114) may use a machine learning model to assist in generating the similarity score. The machine learning model may be a machine learning model such as one described in connection with FIG. 3 below. The data monitoring system 102 may use vector representations of datasets to assist in generating similarity scores as described in more detail below.

The machine learning model may be used to generate one or more vectors that represent the original dataset and/or the derivative dataset. For example, the machine learning model may generate a first vector that represents the original dataset and a second vector that represents the derivative dataset. A vector may represent the schema of a dataset. Schema may include the column descriptions, type of data in each column, or a variety of other metadata associated with a dataset. The schema or a portion of the schema may be input into the machine learning model, and the machine learning model may output a representative vector. Additionally or alternatively, a vector may represent the data of a dataset. For example, data stored in one or more columns of the dataset may be input into the machine learning model and the machine learning model may output a vector that is representative of the data. A vector may represent both the schema and the data (e.g., by inputting both the schema and the data into the machine learning model). A vector may be an average of a vector that represents the schema and a vector that represents the data. In some embodiments, the data monitoring system 102 may generate a first vector and a second vector without a machine learning model. In some embodiments, the data monitoring system 102 may use term frequency-inverse document frequency (TF-IDF) to generate a vector.

In some embodiments, the data monitoring system 102 may select a machine learning model, for example, in response to identifying an original dataset as the source of the derivative dataset. The machine learning model may be selected based on a category associated with the original dataset or the derivative dataset. For example, the category may indicate a type of data contained in the datasets (e.g., text, numbers, images, etc.). The category may indicate a business organization that uses the dataset (e.g., fraud prevention, loans, customer service, etc.). The data monitoring system 102 may select from a variety of machine learning models (e.g., any model described in connection with FIG. 3 below), based on the category associated with a dataset because some machine learning models may perform better with certain categories.

The data monitoring system 102 may use vector representations to generate a similarity score that indicates how similar the derivative dataset and original dataset are. For example, the data monitoring system 102 (e.g., the machine learning subsystem 114) may use a distance metric (e.g., cosine distance, Euclidean distance, Manhattan distance, or a variety of other distance metrics) to generate a similarity score.

In some embodiments, the data monitoring system 102 may compare one or more portions of the derivative dataset with corresponding portions of the original dataset. For example, the data monitoring system 102 may compare the schema of the derivative dataset with the schema of the original dataset. The data monitoring system 102 may generate a vector for each portion. Each vector may be compared by generating a similarity score for each portion. For example, there may be a similarity score corresponding to the comparison of vectors that represent schema of the datasets, and a similarity score corresponding to the comparison of vectors that represent data of the vectors (e.g., a first vector representing the data of the original dataset and a second vector representing the data of the derivative dataset).

Similarity scores may be weighted and combined, for example, if there is more than one similarity score indicating how similar the original dataset is to the derivative dataset. Weighting different similarity scores and combining them may provide a more accurate measurement of whether a derivative dataset is similar to an original dataset. For example, a first similarity score indicating a similarity between the schema of two datasets may be multiplied by a first weight. A second similarity score indicating a similarity between the data of two datasets may be multiplied by a second weight. The two weighted similarity scores may be averaged to create a final similarity score that may be compared with a threshold score. If the threshold is satisfied, the two datasets may be determined to be similar to each other.

In some embodiments, a machine learning model may be used to weight each similarity score. The machine learning model may have been trained to determine weighting to be applied to a variety of similarity scores or similarity scoring techniques. The machine learning model may have been trained based on (i) training datasets, (ii) datasets derived from the training datasets, (iii) lineage data subsets corresponding to the training datasets and the datasets derived from the training datasets, and/or (iv) similarity scores generated using the similarity scoring techniques.

Additionally or alternatively, the machine learning model may be a supervised machine learning model that is trained on labeled data. Features of the labeled data may include similarity scores corresponding to schema of datasets, similarity scores corresponding to data within the datasets, an identification of the datasets and their relationship (e.g., which dataset is original, which dataset is a derivative dataset, etc.), or a variety of other features. Labels of the labeled data may include an indication of whether two datasets are similar or not. The machine learning model may be a neural network and may train by adjusting weights of the neural network. The machine learning model may be trained to generate weights for each feature (e.g., each similarity score in the training data or other data). For example, a weighted average of the similarity scores may be above a similarity threshold in instances where a corresponding label indicates that two datasets are similar, and the weighted average of the similarity scores may be below a similarity threshold in instances where a corresponding label indicates that two datasets are not similar.

In some embodiments, the data monitoring system 102 may use a layered approach to determine whether two datasets are similar or not. For example, the data monitoring system 102 may generate vectors and a similarity score for the schema of two datasets to determine if the two datasets are similar. If the similarity score exceeds a first threshold (e.g., 0.7), the data monitoring system 102 may determine that the two datasets are similar. If the similarity score is below a second threshold (e.g., 0.3), the data monitoring system 102 may determine that the two datasets are not similar. If the similarity score is between the first and second threshold (e.g., between 0.3 and 0.7), the data monitoring system 102 may perform additional comparisons of the two datasets. For example, the data monitoring system 102 may generate additional vectors representing the data or a portion of the data of the two datasets and generate a corresponding second similarity score. If the second similarity score satisfies the first threshold (e.g., 0.7) or a third threshold (e.g., 0.6) then the data monitoring system 102 may determine that the two datasets are similar.

The data monitoring system may weight each similarity score based on the weights generated for each similarity score. For example, each similarity score may be multiplied by its corresponding weight. Each of the similarity scores may then be averaged to generate a weighted score, which may be compared with a threshold as described above.

In response to determining that two datasets (e.g., the original dataset and the derivative dataset) are similar (e.g., because the weighted similarity score satisfies a threshold score), the data monitoring system 102 may modify the derivative dataset or the original dataset. Modifying the datasets may include merging the derivative dataset with the original dataset. The data monitoring system 102 may merge a portion of the derivative dataset with the original dataset. Modifying the datasets may include deleting a portion of the derivative dataset. Modifying the datasets may include deleting data (e.g., sensitive data) from the derivative dataset or the original dataset. For example, the data monitoring system 102 may delete one or more columns of data from the derivative dataset. Modifying the datasets may include replacing data (e.g., sensitive data) in the derivative or original dataset with placeholder data or alternative data (e.g., anonymized data).

In response to determining that two datasets (e.g., the original dataset and the derivative dataset) are similar (e.g., because the weighted similarity score satisfies a threshold score), the data monitoring system 102 may modify access rights to the derivative or original dataset. For example, the data monitoring system 102 may modify access rights of a user that has access to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset. For example, the user's access may be modified such that the user is unable to access one or more columns or one or more rows of the derivative dataset.

Additionally or alternatively, the data monitoring system 102 may send a recommendation or alert, for example, in response to determining that two datasets (e.g., the original dataset and the derivative dataset) are similar. For example, the data monitoring system 102 (e.g., via the notification subsystem 116) may send an alert to the user device 104. The alert may indicate that the derivative or original dataset should be modified or that access rights to the derivative or original dataset should be modified. The alert or recommendation may include a mechanism that enables an authorized administrator or other user to effectuate a modification of a dataset or a modification of access rights. For example, the alert or recommendation may include a link, a button, or other item that when interacted with, causes a script to run to perform a recommended modification (e.g., any modification of dataset or access rights described above in connection with FIG. 1 or described below in connection with FIG. 4a-4b).

The user device 104 may be any computing device, including, but not limited to, a laptop computer, a tablet computer, a hand-held computer, smartphone, other computer equipment (e.g., a server or virtual server), including "smart," wireless, wearable, or mobile devices.

The data monitoring system 102 may include one or more computing devices described above or may include any type of mobile terminal, fixed terminal, or other device. For example, the data monitoring system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the data monitoring system 102, those operations may be performed by components of the user device 104, or database 106. In some embodiments, the various computers and systems described herein may include one or more computing devices that are programmed to perform the described functions.

One or more components of the data monitoring system 102, user device 104, or database 106, may receive content or data via input/output (hereinafter "I/O") paths. The one or more components of the data monitoring system 102, the user device 104, or the database 106 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the data monitoring system 102, the user device 104, or the database 106 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a Universal Serial Bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a satellite network, a combination of these networks, or other types of communications networks or combinations of communications networks. The devices in FIG. 1 (e.g., data monitoring system 102, the user device 104, or the database 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, or firmware components operating together. For example, the data monitoring system 102, any component of the processing system (e.g., the communication subsystem 112, the ML subsystem 114, or the notification subsystem 116), the user device 104, or the database 106 may be implemented by one or more computing platforms.

Figure 3:
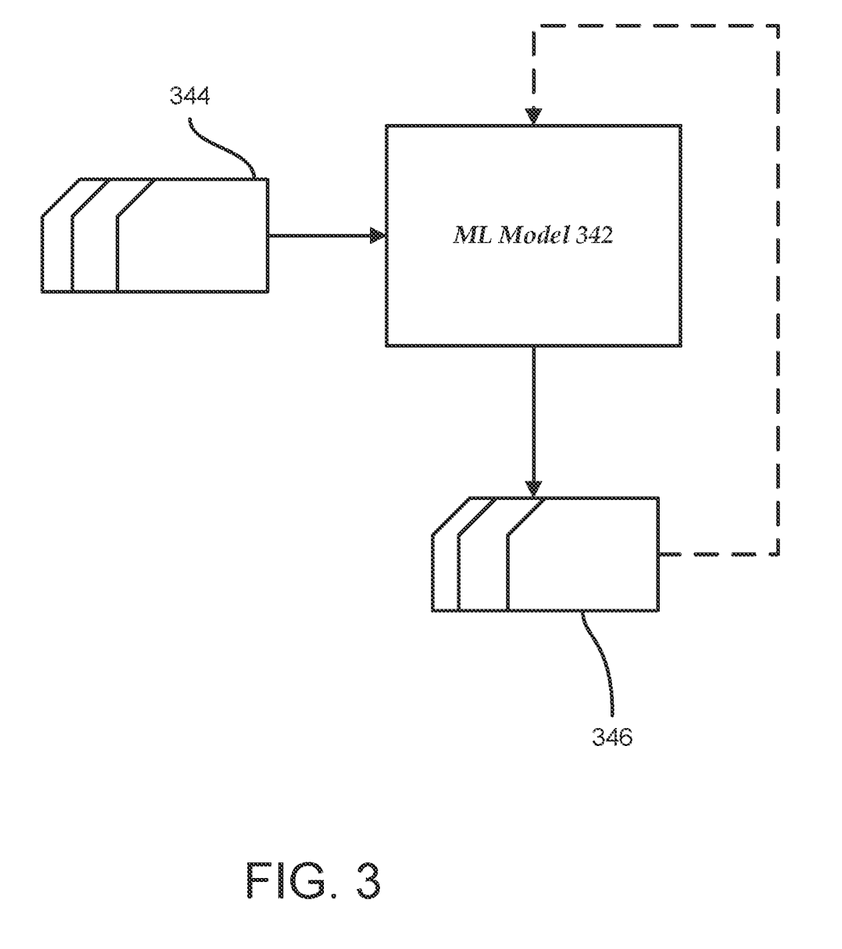
FIG. 3 shows an example machine learning model, in accordance with some embodiments.

One or more machine learning models discussed above may be implemented (e.g., in part), for example, as shown in FIGS. 1-3. With respect to FIG. 3, machine learning model 342 may take inputs 344 and provide outputs 346. In one use case, outputs 346 may be fed back to machine learning model 342 as input to train machine learning model 342 (e.g., alone or in conjunction with user indications of the accuracy of outputs 346, labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 342 may be trained to generate results (e.g., modified processing requests, predicted actions as part of a reinforcement learning model, etc.) with better recall or precision.

In some embodiments, the machine learning model 342 may include an artificial neural network. In some embodiments, machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 342 may be self-learning or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 342 trained by the machine learning subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 342 may be structured as a factorization machine model. The machine learning model 342 may be a non-linear model or supervised learning model that can perform classification or regression. For example, the machine learning model 342 may be a general-purpose supervised learning algorithm that the system uses for both classification and regression tasks. Alternatively, the machine learning model 342 may include a Bayesian model configured to perform variational inference. The machine learning model 342 may be configured to determine whether two datasets are similar, to generate a vector representation of a dataset or a portion of a dataset, or a variety of other functions described above in connection with FIGS. 1-2B.

Figure 4A:
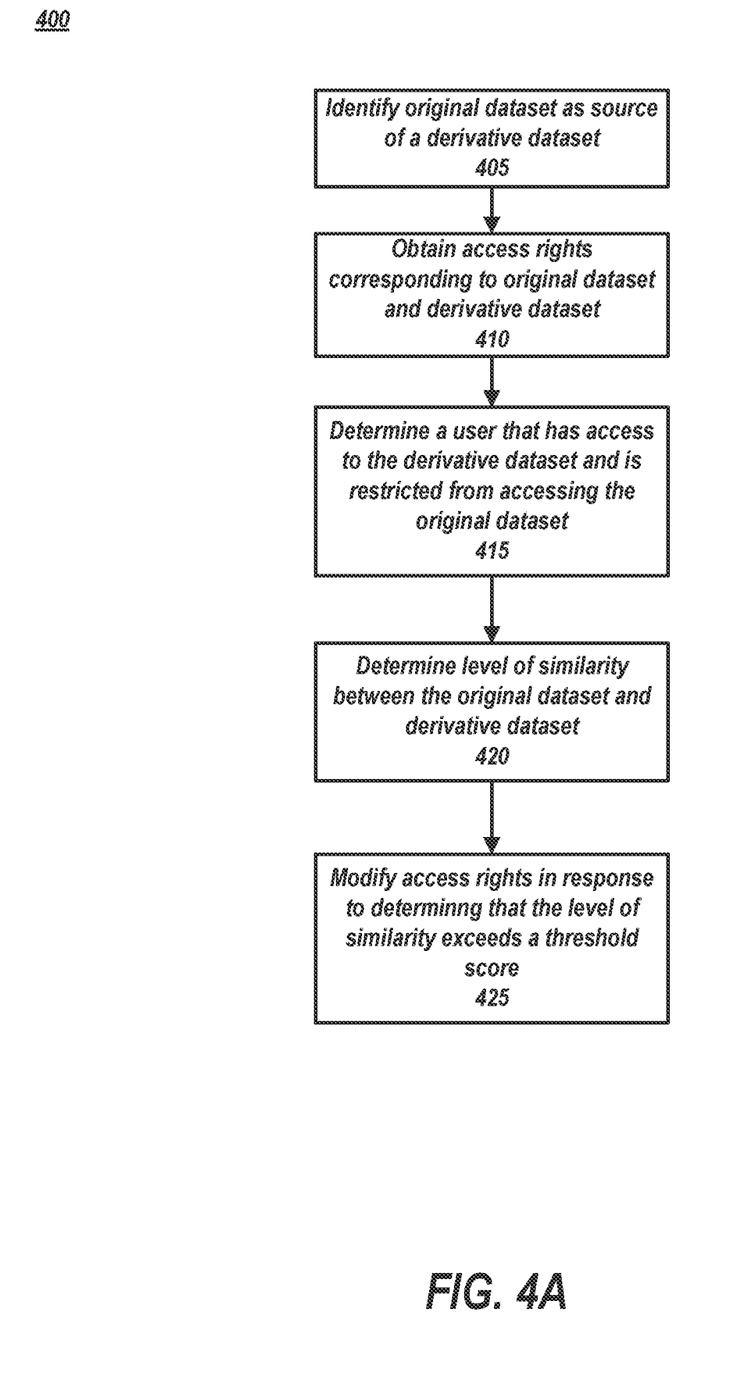
FIG. 4A shows an example flowchart of the actions involved in using machine learning to manage access rights to data, in accordance with some embodiments.
Figure 4B:
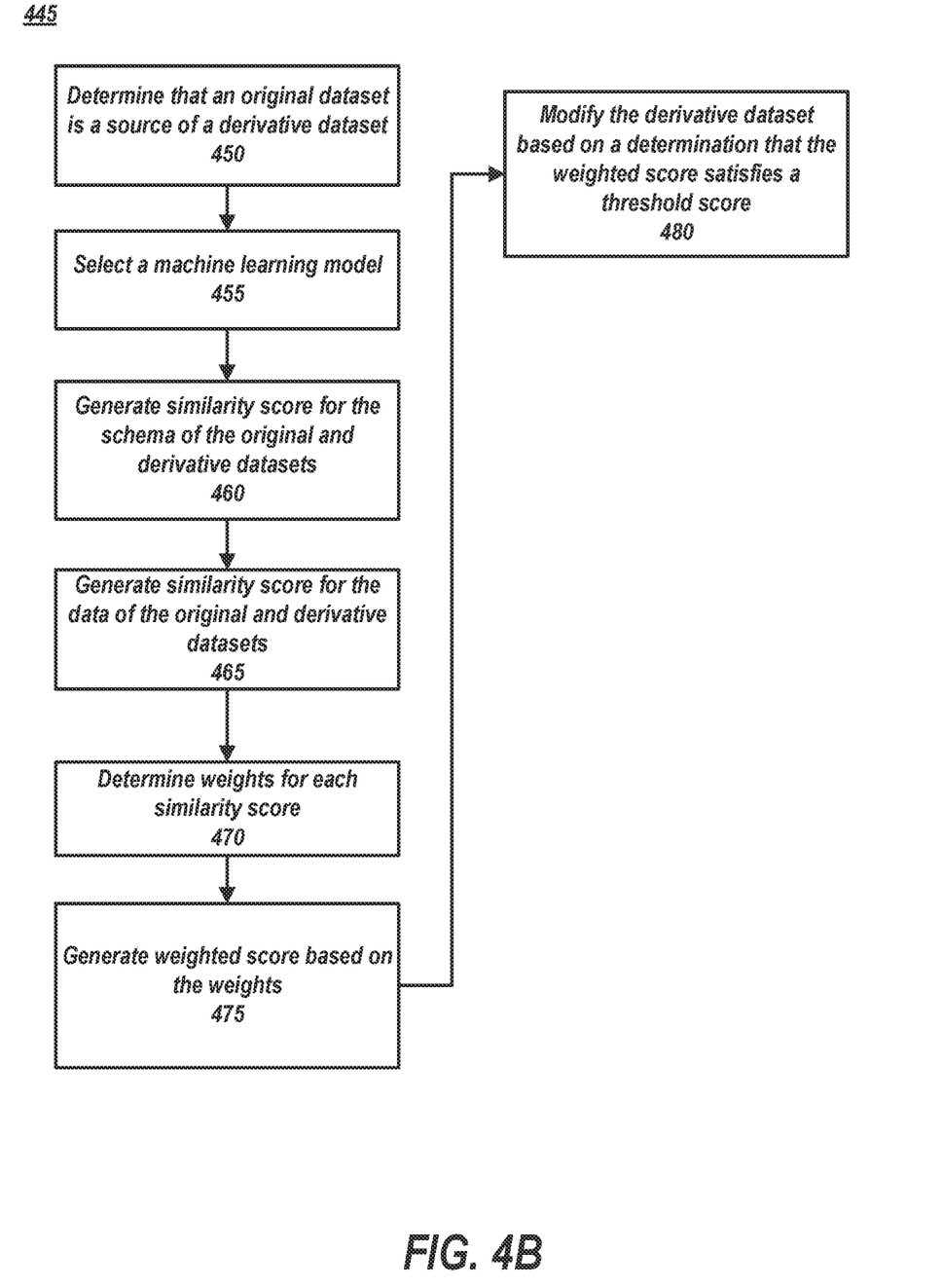
FIG. 4B shows an example flowchart of the actions involved in using machine learning to manage data, in accordance with some embodiments.

FIGS. 4A-4B are example flowcharts of processing operations of methods that enable the various features and functionality of the systems as described in detail above. The processing operations of each method presented below are intended to be illustrative and non-limiting. In some embodiments, for example, the methods may be accomplished with one or more additional operations not described, or without one or more of the operations discussed. Additionally, the order in which the processing operations of the methods are illustrated (and described below) is not intended to be limiting.

Figure 5:
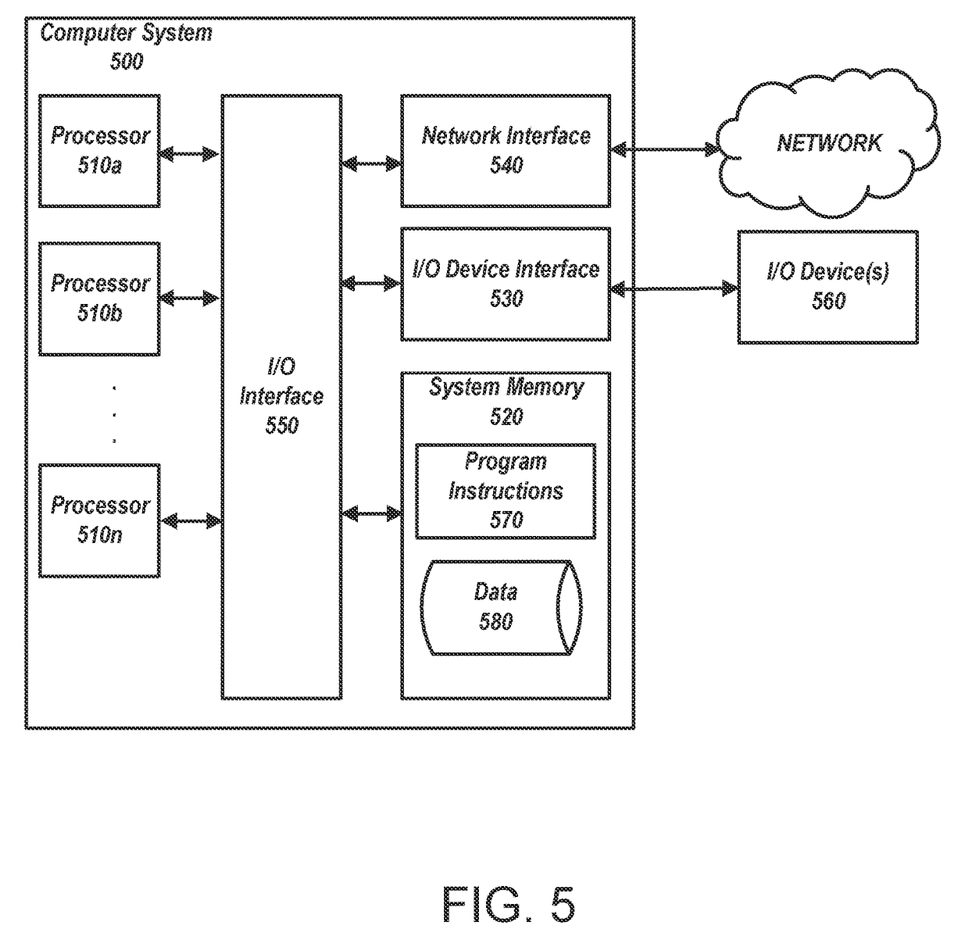
FIG. 5 shows an example computing system that may be used in accordance with some embodiments.

In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that, in some embodiments, the operations performed by data monitoring system 102 may be performed using one or more components in system 100 (FIG. 1) or computer system 500 via network interface 540 (FIG. 5).

FIG. 4A shows an example flowchart of the actions involved in using machine learning and lineage data to prevent derivative data access. For example, process 400 may represent the actions taken by one or more devices shown in FIGS. 1-3 and described above. At 405, data monitoring system 102 identifies an original dataset as a source of a derivative dataset. For example, the original dataset may include credit card transactions that occurred at multiple retail stores and the derivative dataset may include the average number of transactions for each retail store and an average purchase amount at each retail store. The data monitoring system 102 may access a directed acyclic graph (DAG) or other data structure that indicates an original dataset from which a derivative dataset was created.

At 410, data monitoring system 102 obtains access rights corresponding to the original dataset or access rights corresponding to the derivative dataset. For example, the access rights may comprise a list of users that are authorized to access the original dataset and a list of users that are authorized to access the derivative dataset.

At 415, data monitoring system 102 determines a user that has access to the derivative dataset and is restricted from accessing the original dataset. For example, the data monitoring system 102 may compare the list of users that have access to the derivative dataset with the list of users that have access to the original dataset to determine whether there are any users that do not have access to both datasets. A user that is found in the list associated with the derivative dataset and not on the list associated with the original dataset may be flagged as a user that may need to have their access rights changed.

At 420, data monitoring system 102 determines a level of similarity between the original dataset and the derivative dataset. The level of similarity may be determined in response to determining that the user has access to the derivative dataset. The similarity score may indicate a level of similarity between the original dataset and the derivative dataset. For example, the data monitoring system 102 may generate a vector representation of the original dataset and a vector representation of the derivative dataset. A similarity score may be generated using a distance metric (e.g., cosine similarity, Euclidean distance, Manhattan distance, etc.) that compares the vector representations.

At 425, data monitoring system 102 modifies access rights in response to determining that the level of similarity exceeds a threshold score. For example, the data monitoring system 102 may compare the similarity metric with a threshold (e.g., 0.6, 0.8, etc.) and if the similarity metric is higher than the threshold score, the data monitoring system 102 may determine that the derivative dataset is similar to the original dataset. In response, the data monitoring system 102 may modify access rights to the derivative dataset. For example, a user that is not authorized to access the original dataset may have access rights modified so that the user is also unable to access the derivative dataset.

It is contemplated that the actions or descriptions of FIG. 4A may be used with any other embodiment of this disclosure. In addition, the actions and descriptions described in relation to FIG. 4A may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 could be used to perform one or more of the actions in FIG. 4A.

FIG. 4B shows an example flowchart of the actions involved in using machine learning and lineage data to modify derivative datasets. For example, process 445 may represent the actions taken by one or more devices shown in FIGS. 1-3 and described above. At 450, data monitoring system 102 may identify an original dataset as a source of a derivative dataset. For example, the original dataset may include automobile loan information including amount of loan, make and model of vehicle, customer information from multiple dealerships, or a variety of other information. The derivative dataset may include the average number of loans made in a month per dealership, the median loan amount per dealership, or a variety of other information. The data monitoring system 102 may access a directed acyclic graph (DAG) or other data structure that indicates an original dataset from which a derivative dataset was created.

At 455, data monitoring system 102 may select a machine learning model. The machine learning model may be used to determine weights to apply to different characteristics of a dataset (e.g., different vectors representing different portions of a dataset), which may enable the data monitoring system 102 to determine whether two datasets are similar or not. The machine learning model may be selected based on a category associated with the original dataset or the derivative dataset. For example, one machine learning model may be selected for datasets associated with automobile loans and a different machine learning model may be selected for datasets associated with credit card transactions. The machine learning model may be trained to determine weighting to be applied to similarity scores. For example, the machine learning model may be trained using (i) training datasets, (ii) datasets derived from the training datasets, (iii) lineage data subsets corresponding to the training datasets and the datasets derived from the training datasets, and (iv) similarity scores generated using similarity scoring techniques. The similarity scoring techniques comprising a schema similarity scoring technique and an entry similarity scoring technique.

At 460, data monitoring system 102 may generate a similarity score indicating the similarity between the schema of the original dataset and the schema of the derivative dataset. For example, the data monitoring system 102 may generate a vector representation of the schema of the original dataset and a vector representation of the schema of the derivative dataset. A similarity score may be generated using a distance metric (e.g., cosine similarity, Euclidean distance, Manhattan distance, etc.) that compares the vector representations.

At 465, data monitoring system 102 may generate a similarity score indicating the similarity between the data of the original dataset and the data of the derivative dataset. For example, the data monitoring system 102 may generate a vector representation of the data of the original dataset and a vector representation of the data of the derivative dataset. A similarity score may be generated using a distance metric (e.g., cosine similarity, Euclidean distance, Manhattan distance, etc.) that compares the vector representations.

At 470, data monitoring system 102 may determine weights for each similarity score. For example, the data monitoring system 102 may input the original dataset, the derivative dataset, lineage data, or the similarity scores determined at 460 and 465 into a machine learning model. The machine learning model may output weights indicating how much each similarity score should be weighted in a combined similarity score.

At 475, data monitoring system 102 may generate a weighted similarity score based on the weights determined in 470. For example, the data monitoring system 102 may input the original dataset, the derivative dataset, lineage data, or the similarity scores determined at 460 and 465 into a machine learning model. The machine learning model may output weights indicating how much each similarity score should be weighted in a combined similarity score.

At 480, data monitoring system 102 may modify the derivative dataset based on a determination that the weighted score satisfies a threshold score. For example, the data monitoring system 102 may compare the weighted score with a threshold score (e.g., 0.7, 0.9, etc.). If the weighted score is higher than the threshold score, the data monitoring system 102 may determine that the derivative dataset is similar to the original dataset. In response, the data monitoring system 102 may determine to modify the derivative dataset. For example, the data monitoring system 102 may merge a portion of the derivative dataset with the original dataset.

It is contemplated that the actions or descriptions of FIG. 4B may be used with any other embodiment of this disclosure. In addition, the actions and descriptions described in relation to FIG. 4B may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 could be used to perform one or more of the actions in FIG. 4B.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to costs constraints, some features disclosed herein may not be presently claimed and may be claimed in later filings, such as continuation applications or by amending the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: identifying, based on lineage data indicating relationships between datasets, a first dataset as a source of a second dataset, the second dataset being derived from data in the first dataset; generating, via a machine learning model, a similarity score indicating a level of similarity between the first dataset and the second dataset; and in response to determining that the similarity score satisfies a threshold score, performing one or more actions with respect to one or more portions of the second dataset.
2. The method of any of the preceding embodiments, wherein modifying the access rights of the user to the derivative dataset comprises: determining a match between a first portion of the derivative dataset and a portion of the first dataset; and restricting, based on the match determination, the user from accessing the first portion of the derivative dataset while allowing the user to access a second portion of the derivative dataset.
3. The method of any of the preceding embodiments, wherein identifying the first dataset and the derivative dataset comprises: receiving a message indicating that the derivative dataset has been created, wherein the message comprises a first identifier associated with the derivative dataset; and determining, based on the lineage data, a data structure comprising the first identifier, a second identifier, and an indication of a location where the derivative dataset is stored, wherein the second identifier corresponds to the first dataset.
4. The method of any of the preceding embodiments, wherein modifying access rights comprises: modifying access rights of the user to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset.
5. The method of any of the preceding embodiments, further comprising: in response to determining that the similarity score satisfies a threshold score, sending, to a monitoring system, an alert indicating that an access conflict exists between the first dataset and the derivative dataset, wherein the alert comprises an identification of the first dataset and the derivative dataset.
6. The method of any of the preceding embodiments, wherein determining that the similarity score satisfies the threshold score comprises determining that the similarity score is greater than the threshold score, and wherein modifying access rights of the user to the derivative dataset comprises removing read or write access of the user to the derivative dataset.
7. The method of any of the preceding embodiments, wherein determining that the similarity score satisfies the threshold score comprises determining that the similarity score is greater than the threshold score, and wherein modifying the access rights of the user to the derivative dataset comprises removing write access of the user to the derivative dataset.
8. The method of any of the preceding embodiments, wherein generating the similarity score comprises: generating, via the machine learning model, a first vector representation of a first plurality of column names of the first dataset; generating, via the machine learning model, a second vector representation of a second plurality of column names of the derivative dataset; determining a vector similarity between the first vector representation and the second vector representation; and generating the similarity score based on the vector similarity.
9. The method of any of the preceding embodiments, wherein generating the similarity score comprises: generating, via the machine learning model, a first vector representation of a first plurality of data entries of the first dataset; generating, via the machine learning model, a second vector representation of a second plurality of data entries of the derivative dataset; determining a vector similarity between the first vector representation and the second vector representation; and generating the similarity score based on the vector similarity.
10. The method of any of the preceding embodiments, further comprising: in response to determining that the similarity score exceeds a threshold score, modifying access rights of the user to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset.
11. The method of any of the preceding embodiments, further comprising: in response to determining that the user has access to the derivate dataset and is restricted from accessing the original dataset, obtaining, via a machine learning model, a similarity score indicating a level of similarity between the original dataset and the derivative dataset, the machine learning model generating vector representations of the original dataset and derivative dataset, respectively, to obtain the similarity score.

12. The method of any of the preceding embodiments, further comprising accessing a second machine learning model trained to determine weighting to be applied to multiple similarity scoring techniques; generating, via a first similarity scoring technique, a first similarity score indicating a first similarity level between a first aspect of the first dataset and a corresponding aspect of the second dataset; generating, via an second similarity scoring technique, a second similarity score indicating a second similarity score between a second aspect of the first dataset and a corresponding aspect of the second dataset; obtaining, via the machine learning model, respective weights for the similarity scores; generating, based on the respective weights and the first and second similarity scores, a weighted score; and modifying the first dataset or the second dataset.

13. The method of any of the preceding embodiments, wherein generating the weighted score comprises: generating a weighted first score and a weighted second score by multiplying the first score and the second score by their corresponding weights; and averaging the weighted first score with the weighted second score.

14. The method of any of the preceding embodiments, wherein generating the first similarity score comprises: generating a first vector representative of the schema of the original dataset and a second vector representative of the schema of the derivative dataset; and generating the first similarity score by using a distance metric to compare the first vector with the second vector.

15. The method of any of the preceding embodiments, wherein generating the second similarity score comprises: generating a first vector representative of the data of the original dataset and a second vector representative of the data of the derivative dataset; and generating the second similarity score by using a distance metric to compare the first vector with the second vector.

16. The method of any of the preceding embodiments, wherein generating the first vector comprises: inputting each data entry in the original dataset into a machine learning model; and outputting, via the machine learning model, a vector comprising less than 2000 dimensions.

17. The method of any of the preceding embodiments, wherein generating the first similarity score comprises: generating a first vector representative of the schema of the original dataset and a second vector representative of the schema of the derivative dataset; concatenating the first vector and the second vector; and generating the first similarity score by inputting the concatenated vector into the machine learning model.

18. The method of any of the preceding embodiments, further comprising: training the machine learning model to determine weighting to be applied to multiple similarity scoring techniques based on (i) training datasets, (ii) datasets derived from the training datasets, (iii) lineage data subsets corresponding to the training datasets and the datasets derived from the training datasets, and (iv) similarity scores generated using the similarity scoring techniques, respectively, the similarity scoring techniques comprising a schema similarity scoring technique and an entry similarity scoring technique.

19. The method of any of the preceding embodiments, wherein merging the original dataset with the derivative dataset comprises: determining rows in the original dataset that match rows in the derivative dataset; and deleting the rows.

20. The method of any of the preceding embodiments, wherein merging the derivative dataset with the original dataset is based on determining that a line of business permission set associated with the original dataset does not match a line of business permission set associated with the derivative dataset.

21. The method of any of the preceding embodiments, wherein obtaining respective weights for the similarity scores comprises providing the original dataset, the derivative dataset, a first lineage data subset, and the first and second similarity scores as input to the machine learning model to obtain respective weights for the similarity scores.

22. The method of any of the preceding embodiments, further comprising obtaining access data indicating respective access rights related to the first dataset and the second dataset; determining, based on the access data, that a user has access to the second dataset and is restricted from accessing the first dataset; in response to determining that the user has access to the second dataset and is restricted from accessing the first dataset, generating the similarity score.

23. The method of any of the preceding embodiments wherein modifying the first dataset or the second dataset is performed in response to determining that the weighted score is greater than or less than a threshold score.

24. A tangible, non-transitory, machine-readable medium storing instructions that, when executed by a data processing apparatus, cause the data processing apparatus to perform operations comprising those of any of embodiments 1-23.

25. A system comprising: one or more processors; and memory storing instructions that, when executed by the processors, cause the processors to effectuate operations comprising those of any of embodiments 1-23.

26. A system comprising means for performing any of embodiments 1-23.

What is claimed is:

1. A system for using machine learning and lineage data to prevent derivative data access by users inadvertently authorized to access the derivative data, the system comprising:

storage circuitry configured to store lineage data corresponding to a plurality of datasets, wherein the plurality of datasets comprises an original dataset and a derivative dataset derived from the original dataset, wherein the lineage data indicates a process used to create the derivative dataset from the original dataset; and control circuitry configured to perform operations comprising:

identifying, based on a processing of the lineage data, the original dataset as a source of the derivative dataset;

in response to the original dataset being identified as the source, obtaining access data indicating respective access rights related to the original dataset and the derivative dataset;

determining, based on the access data, that a user has access to the derivative dataset and is restricted from accessing the original dataset;

in response to determining that the user has access to the derivate dataset and is restricted from accessing the original dataset, obtaining, via a machine learning model, a similarity score indicating a level of similarity between the original dataset and the derivative dataset, the machine learning model generating vector representations of the original dataset and derivative dataset, respectively, to obtain the similarity score; and in response to determining that the similarity score exceeds a threshold score, modifying access rights of the user to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset.

2. A method comprising:

identifying, based on lineage data indicating relationships between datasets, a first dataset as a source of a second dataset, the second dataset being derived from data in the first dataset;

obtaining access data indicating respective access rights related to the first dataset and the second dataset;

determining, based on the access data, that a user has access to the second dataset and is restricted from accessing the first dataset;

in response to determining that the user has access to the second dataset and is restricted from accessing the first dataset, generating, via a machine learning model, a similarity score indicating a level of similarity between the first dataset and the second dataset; and in response to determining that the similarity score satisfies a threshold score, modifying access rights of the user to one or more portions of the second dataset.

3. The method of claim 2, wherein modifying the access rights of the user to the derivative dataset comprises:

determining a match between a first portion of the derivative dataset and a portion of the first dataset; and restricting, based on the match determination, the user from accessing the first portion of the derivative dataset while allowing the user to access a second portion of the derivative dataset.

4. The method of claim 2, wherein identifying the first dataset and the derivative dataset comprises:

receiving a message indicating that the derivative dataset has been created, wherein the message comprises a first identifier associated with the derivative dataset; and determining, based on the lineage data, a data structure comprising the first identifier, a second identifier, and an indication of a location where the derivative dataset is stored, wherein the second identifier corresponds to the first dataset.

5. The method of claim 2, wherein modifying access rights comprises:

modifying access rights of the user to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset.

6. The method of claim 2, further comprising:

in response to determining that the similarity score satisfies a threshold score, sending, to a monitoring system, an alert indicating that an access conflict exists between the first dataset and the derivative dataset, wherein the alert comprises an identification of the first dataset and the derivative dataset.

7. The method of claim 2, wherein determining that the similarity score satisfies the threshold score comprises determining that the similarity score is greater than the threshold score, and wherein modifying access rights of the user to the derivative dataset comprises removing read or write access of the user to the derivative dataset.

8. The method of claim 2, wherein determining that the similarity score satisfies the threshold score comprises determining that the similarity score is greater than the threshold score, and wherein modifying the access rights of the user to the derivative dataset comprises removing write access of the user to the derivative dataset.

9. The method of claim 2, wherein generating the similarity score comprises:

generating, via the machine learning model, a first vector representation of a first plurality of column names of the first dataset;

generating, via the machine learning model, a second vector representation of a second plurality of column names of the derivative dataset;

determining a vector similarity between the first vector representation and the second vector representation; and generating the similarity score based on the vector similarity.

10. The method of claim 2, wherein generating the similarity score comprises:

generating, via the machine learning model, a first vector representation of a first plurality of data entries of the first dataset;

generating, via the machine learning model, a second vector representation of a second plurality of data entries of the derivative dataset;

determining a vector similarity between the first vector representation and the second vector representation; and generating the similarity score based on the vector similarity.

11. The method of claim 2, in response to determining that the similarity score exceeds a threshold score, modifying access rights of the user to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset.

12. A non-transitory, computer-readable medium comprising instructions that when executed by one or more processors, causes operations comprising:

identifying, based on lineage data indicating relationships between datasets, a first dataset as a source of a second dataset, the second dataset being derived from data in the first dataset;

obtaining access data indicating respective access rights related to the first dataset and the second dataset;

determining, based on the access data, that a user has access to the second dataset and is restricted from accessing the first dataset;

in response to determining that the user has access to the second dataset and is restricted from accessing the first dataset, generating, via a machine learning model, a similarity score indicating a level of similarity between the first dataset and the second dataset; and in response to determining that the similarity score satisfies a threshold score, modifying access rights of the user to one or more portions of the second dataset.

13. The computer-readable medium of claim 12, wherein generating the similarity score comprises:
   generating a first dataset vector representative of a portion of the first dataset;
   generating a derivative vector representative of a portion of the derivative dataset; and
   using a distance metric to determine the similarity between the first dataset and the derivative dataset.

14. The computer-readable medium of claim 12, wherein modifying the access rights of the user to the derivative dataset comprises:
   determining a match between a first portion of the derivative dataset and a portion of the first dataset; and
   restricting, based on the match determination, the user from accessing the first portion of the derivative dataset while allowing the user to access a second portion of the derivative dataset.

15. The computer-readable medium of claim 12, wherein identifying the first dataset and the derivative dataset comprises:
   receiving a message indicating that the derivative dataset has been created, wherein the message comprises a first identifier associated with the derivative dataset; and
   determining, based on the lineage data, a data structure comprising the first identifier, a second identifier, and an indication of a location where the derivative dataset is stored, wherein the second identifier corresponds to the first dataset.

16. The computer-readable medium of claim 12, wherein modifying access rights comprises:
   modifying access rights of the user to the derivative dataset such that (i) the modification disables data access of the user to a first portion of the derivative dataset that was accessible to the user prior to the modification and (ii) the modification maintains data access of the user to a second portion of the derivative dataset different from the first portion of the derivative dataset.

17. The computer-readable medium of claim 12, further comprising:
   in response to determining that the similarity score satisfies a threshold score, sending, to a monitoring system, an alert indicating that an access conflict exists between the first dataset and the derivative dataset, wherein the alert comprises an identification of the first dataset and the derivative dataset.

18. The computer-readable medium of claim 12, wherein determining that the similarity score satisfies the threshold score comprises determining that the similarity score is greater than the threshold score, and wherein modifying access rights of the user to the derivative dataset comprises removing read or write access of the user to the derivative dataset.

19. The computer-readable medium of claim 12, wherein determining that the similarity score satisfies the threshold score comprises determining that the similarity score is greater than the threshold score, and wherein modifying the access rights of the user to the derivative dataset comprises removing write access of the user to the derivative dataset.

20. The computer-readable medium of claim 12, wherein generating the similarity score comprises:
   generating, via the machine learning model, a first vector representation of a first plurality of column names of the first dataset;
   generating, via the machine learning model, a second vector representation of a second plurality of column names of the derivative dataset;
   determining a vector similarity between the first vector representation and the second vector representation; and
   generating the similarity score based on the vector similarity.

* * * * *